United States Patent [19]

Barclay et al.

[11] 4,017,271
[45] Apr. 12, 1977

[54] PROCESS FOR PRODUCTION OF SYNTHESIS GAS

[75] Inventors: Kenneth M. Barclay, Woodland Hills; James R. Birk, San Jose; William E. Parkins, Woodland Hills, all of Calif.

[73] Assignee: Rockwell International Corporation, El Segundo, Calif.

[22] Filed: June 19, 1975

[21] Appl. No.: 588,563

[52] U.S. Cl. .............................. 48/197 R; 48/203; 48/210; 252/373; 423/415 R
[51] Int. Cl.² ...................... C10K 1/00; C10J 3/00
[58] Field of Search ................ 48/203, 210, 197 R; 260/449 M; 252/373; 423/415, 244; 110/1 J

[56] References Cited
UNITED STATES PATENTS

| | | | |
|---|---|---|---|
| 3,533,739 | 10/1970 | Pelczarski et al. ................ | 423/415 |
| 3,692,506 | 9/1972 | Johnson ................ | 48/210 |
| 3,758,673 | 9/1973 | Buben et al. ................ | 423/415 |
| 3,890,113 | 6/1975 | Child et al. ................ | 260/449 M |
| 3,916,617 | 11/1975 | McKenzie et al. ................ | 48/203 |

*Primary Examiner*—Robert L. Lindsay, Jr.
*Assistant Examiner*—George C. Yeung
*Attorney, Agent, or Firm*—L. Lee Humphries; Henry Kolin; Clark E. DeLarvin

[57] ABSTRACT

A process for the production of a synthesis gas, capable of being upgraded to a high BTU pipeline gas, by the partial oxidation and substantially complete gasification of a carbonaceous material under CO-promoting conditions wherein the carbonaceous material, oxygen, and recycled carbon dioxide from the process are introduced into a molten salt containing an alkali metal carbonate and a minor portion of an alkali metal sulfide, the system being operated at a selected temperature and pressure between 1400° and 2000° F and between 1 and 100 atmospheres. The molar ratio of carbon dioxide to oxygen employed is controlled at from about 0.6:1 to about 1.2:1 to control the CO production and also to maintain the molten salt at a desired operating temperature. Sulfur and ash introduced with the fuel are retained in the molten salt. The gaseous effluent, containing a molar ratio of carbon monoxide to carbon dioxide substantially greater than one, is reacted in a water gas shift reaction, followed by removal of the carbon dioxide present in the gaseous effluent from the shift reaction to produce the synthesis gas, capable of being reacted further under appropriate conditions to produce pipeline gas, methanol, ammonia, or gasoline. At least a portion of the removed carbon dioxide is recycled for admixture with the oxygen to form the feed gas to the molten salt containing the carbonaceous material.

12 Claims, 5 Drawing Figures

PROCESS FOR PRODUCTION OF SYNTHESIS GAS

CROSS REFERENCE TO RELATED APPLICATIONS

This application is related to and its subject matter is referred to in U.S. Patent Application Ser. No. 456,425 filed Mar. 29, 1974, now U.S. Pat. No. 3,916,617, which is directed to a process for the production of a low BTU gas.

BACKGROUND OF THE INVENTION

This invention broadly relates to a process for the production of a synthesis gas. More particularly, it relates to a molten salt process for the partial combustion and complete gasification of carbonaceous materials under CO-promoting conditions to obtain a gaseous effluent containing a high ratio of carbon monoxide to carbon dioxide, which is then converted to a synthesis gas.

PRIOR ART

The combustion of a carbonaceous material such as a solid carbonaceous fuel by reaction with a source of gaseous oxygen is well known. In such a reaction, an amount of air or oxygen equal to or greater than that required for complete combustion is used, whereby the gaseous effluent contains carbon dioxide with little, if any, carbon monoxide. It is known also to carry out the gasification or partial oxidation of solid carbonaceous materials or fuels employing a limited quantity of oxygen or air so as to produce some carbon monoxide together with carbon dioxide.

Such prior art combustion reactions generally have been carried out in a single stage to obtain substantially complete oxidation of the carbonaceous material or fuel, so that only a minor amount of carbon monoxide is present in the effluent gas. In many cases, carbonaceous materials or fuels often contain impurities such as sulfur, and, hence, during gasification and combustion thereof undesirable acidic pollutants such as oxides of sulfur are formed.

The use of molten salts in the combustion and gasification of carbonaceous materials also is known. U.S. Pat. No. 3,710,737 to Birk, directed to a method for producing heat, discloses carrying out the combustion of carbonaceous materials in a molten salt medium comprising an alkali metal carbonate melt containing a minor amount of alkali metal sulfate or sulfide. In such a combustion reaction, the combination of the oxygen and carbon occurs indirectly, as described in the above patent, and the alkali metal carbonate, such as sodium carbonate, provides a compatible salt medium at practical operating temperatures, retains heat for conducting the combustion reaction, and also reacts with and neutralizes acidic or undesirable pollutants such as sulfur-containing gases which are formed during combustion of carbonaceous materials, e.g., coal, containing impurities such as sulfur and sulfur-bearing compounds. A similar reaction in such molten salt medium is disclosed in U.S. Pat. No. 3,708,270 to Birk et al, directed to a method of pyrolyzing carbonaceous material. A carbonaceous feed is thermally decomposed in a pyrolysis zone by heating it in the absence of oxygen to form char and a gaseous effluent. An optional steam input for gasification of the char material also may be utilized. In a heat generation zone, carbon and oxygen are reacted to form carbon dioxide to provide heat for the pyrolytic decomposition reaction.

In both of the above patents the reaction in the alkali melt is carried out to maximize heat generation by achieving substantially complete combustion so that the reaction product principally contains $CO_2$, and also $N_2$ where air is the source of oxygen. Thus, in these patents, particularly U.S. Pat. No. 3,710,737, it is noted that carbon monoxide formation is undesirable and although provision is made for a separate furnace or burner to combust any carbon monoxide or other hydrocarbons present, carbon monoxide is stated to be a minor product of the reaction.

The above patents point out that an excess of carbon is used, i.e., an amount of oxygen less than that stoichiometrically required for complete oxidation of the carbonaceous material is present in the melt, so that under steady-state operating conditions the sulfur present in the melt is maintained substantially all in the sulfide form. These conditions are employed in these patents not for purposes of obtaining incomplete combustion and formation of carbon monoxide, but in a manner so that substantially complete combustion of the char or coal to $CO_2$ is achieved with as little production of CO as possible. Thereby, a maximum amount of heat is obtained from the char or coal, most of this heat being generated in the molten salt. Whereas, the present invention is directed to obtaining CO as the major product from the partial combustion and gasification process occurring in the molten salt.

U.S. Pat. No. 3,567,412 to Lefrancois et al describes a process for the production of a hydrogen-rich gas in which a two-zone furnace is utilized for the gasification of carbonaceous materials, in one zone of which steam and a carbonaceous material are added to an alkali metal carbonate melt. The resulting char is transferred to the second melt-containing zone where it is catalytically combusted to provide heat for the gasification reaction by maintaining at least a critical minimum concentration of 0.4 weight percent sodium sulfate.

U.S. Pat. No. 3,567,377 to Lefrancois et al is directed to absorption of sulfur from liquid and solid carbonaceous materials by contacting such material with a molten salt. There is envisioned either a two-step process of gasification (steam plus carbonaceous material) plus combustion or a two-step process involving sulfate reduction and pyrolysis, plus an oxidation step in which heat is produced by an exothermic oxidation of a carbonaceous material.

U.S. Pat. No. 3,252,773 to Solomon et al discloses bringing a carbon-containing solid material and steam into contact with a melt comprising an alkali metal compound under conditions such that a hydrogen-rich gas is formed along with a resultant char. As an adjunct, heat may be supplied for the gasification reaction by combusting the resultant char with air, a requirement of the system being that any heat generation occurs as the direct combustion of carbon by the reaction of carbon and oxygen to form carbon dioxide.

It is noted that the three above-mentioned molten salt patents, which form the basis of the Kellogg Molten Salt Coal Gasification Process, employ steam. Steam reacts with sulfides contained in the molten salt, generally present from sulfur-containing solid or liquid fuels, to form a gaseous hydrogen sulfide pollutant, which is, of course, undersirable and requires subsequent removal. The process of the present invention avoids the use of steam and hence retains substantially all of the sulfide pollutants in the molten salt.

The Pelczarski et al Pat. Nos. 3,533,739 and 3,526,478 disclose the gasification of a solid sulfur-bearing fuel wherein the fuel is injected into a molten iron bath maintained at a temperature above about 1400° C, and a limited quantity of oxygen or air is also injected into the bath. Carbon contained in the fuel is absorbed by the iron and preferentially reacts with the air or oxygen to form carbon monoxide which then passes upwardly through the iron bath. A molten layer of lime-bearing slag is maintained on the surface of the molten iron bath.

U.S. Pat. No. 2,737,448 to Cunningham et al discloses a continuous process for production of high purity carbon monoxide by reacting pure oxygen with a fluidized bed of burning coke, while simultaneously repressing the heat of the reaction by addition of a limited amount of carbon dioxide. The carbon dioxide is obtained by subsequently partially burning the carbon monoxide produced with limited amounts of oxygen to produce a carbon monoxide-carbon dioxide gas mixture, separating and returning the carbon dioxide to the initial reaction.

The process of the present invention, on the other hand, utilizes a molten salt for carrying out the partial combustion and substantially complete gasification reaction of the carbonaceous material therein, utilizing a mixture of gaseous oxygen and recycle carbon dioxide from the process, the carbon dioxide when employed in such process in combination with the molten salt, having certain important advantages over the process of the Cunningham et al patent. It is further noted that in the present invention the $CO_2$ utilized is not obtained from a partial combustion of some of the CO produced in the first step, but is produced as an integral part of the process, being obtained from the water gas shift reaction carried out in a later step, as pointed out hereinafter.

U.S. Pat. No. 3,385,668 to Schunemann discloses preparation of carbon monoxide by reaction of carbon dioxide with finely divided carbon in a molten sodium chloride bath containing a small amount of sodium carbonate as catalyst. There is no disclosure in this patent of the use of oxygen to combust any of the carbon simultaneously with the reaction of the carbon dioxide and carbon in the melt. The patent is also silent with respect to how heat is provided for the reaction, simply stating that the molten sodium chloride bath is maintained at a temperature of approximately 1800° F.

U.S. Pat. No. 3,692,506 to Johnson discloses production of a high BTU gas by gasifying coal in the presence of carbon dioxide, recycled carbon monoxide and supplemental oxygen, in a first gasifier. Carbon monoxide produced in the first gasifier is reacted with steam in a hydrogen generator to produce hydrogen and carbon dioxide which are separated. The carbon dioxide is recycled to the first gasifier and the hydrogen is reacted with coal in a second gasifier to produce the product gas methane. Here again, as in the above-noted Cunningham, et al patent, the primary reaction between the coal, carbon dioxide and oxygen in the first gasifier does not take place in a molten salt, as in the present invention. Further, two gasifiers are required and, as in Cunningham, a part of the product CO is combusted with oxygen to furnish necessary heat to the first of the two gasifiers.

The following processes are briefly noted as being further representative of the state of development of the coal gasification art for purposes of making a pipeline gas. Most of these processes are generally described in *Hydrocarbon Processing*, pages 118–125 (April 1975).

The Lurgi Process is a fixed bed process in which coal is gasified at about 400 psig pressure by an oxygen-steam mixture to produce CO and $H_2$, the $H_2/CO$ ratio in the gas being adjusted by shift conversion.

The Hygas Process involves as the primary reaction, the direct reaction of hydrogen with coal to produce a high BTU fuel gas (essentially methane). This process requires a source of inexpensive hydrogen which does not appear to be presently available.

The Bi-Gas Process involves a short contact time between steam and entrained coal at elevated temperatures and subsequent fluid bed gasification of the resulting char with a steam-oxygen gaseous mixture utilizing pressures between about 1,000 and 1,500 psi.

The Synthane Process of the U.S. Bureau of Mines involves the primary devolatilization of coal in a free fall section followed by gasification of the char produced in a fluid bed by an oxygen-steam mixture, employing pressures of a level similar to those employed in the above Bi-Gas Process.

The $CO_2$ Acceptor Process involves the gasification of coal, such as lignite or subbituminous coal, by steam. The heat required for gasification comes from two sources. One source is a so-called $CO_2$ acceptor, a dolomitic lime, which is transported in the fluidized state through the system. In the gasifier, this acceptor absorbs $CO_2$ and gives up heat to help counteract the endothermic reaction $C + H_2O \rightarrow CO + H_2$. The additional heat required is provided by calcining the acceptor in a second vessel (regenerator) to drive off the $CO_2$. It is calcined at a temperature higher than the gasifier temperature (gasifier temperature is about 1600° F), thus, the acceptor carries sensible heat into the gasifier to provide the additional heat required. The heat for the regeneration is provided by burning product char from the gasifier with air. The pressure level is not known but is believed to be above 400 psi.

Despite the extensive research and development effort in this field for many years, all of the foregoing processes, while commercially feasible to some extent, are still open to various technical, economic and environmental objections which militate against their widespread commercial adoption.

SUMMARY OF THE INVENTION

Accordingly, it is an object of the present invention to provide an improved process for producing a synthesis gas from carbonaceous material which can be upgraded to produce a high BTU pipeline gas or which can be used in chemical synthesis, e.g., for the production of methanol and which is free from the objections hitherto present. It is another object of the present invention to provide a molten salt gasification process which obviates the need for removal of pollutants formed in the gasification stage. It is yet another object to provide a gasification process applicable to a wide variety of carbonaceous materials and coals.

In accordance with the broad aspects of the present invention, a carbonaceous material such as coal is introduced, together with oxygen and recycled carbon dioxide from the process, separately or in admixture, into a reaction zone under CO-promoting conditions.

The reaction zone is preferably maintained at above atmospheric pressure. Pressures from 1 to about 100 atmospheres can be employed; preferred pressures are from about 5 to about 30 atmospheres.

It is considered essential that several key reaction parameters be controlled and interrelated so as to favor incomplete combustion of the carbonaceous material and substantially complete gasification so as to maximize production of CO, consistent with maintenance of the molten salt temperature at a desired value, as well as to provide adequate throughput of coal or carbonaceous material in the most economical manner.

The reaction zone contains a molten salt mixture comprising a major portion of at least one alkali metal carbonate and a minor portion of at least 1 wt. % of an alkali metal sulfide. The molten salt during the reaction must contain carbon in an amount of about 1 to 10% by weight of the salt, preferably between 3.5 and 7.5 wt. %. This presence of carbon favors having a high CO to $CO_2$ ratio in the initial gaseous effluent because of the promotion of the reaction between C and $CO_2$ to form CO.

The proportion of carbon dioxide to oxygen employed in the feed gas mixture is selected to maintain a desired temperature in the molten salt reaction zone. The reaction in the molten salt between $CO_2$ and carbon believed to be catalyzed by components present in the molten salt, is endothermic and, thus, absorbs a part of the heat generated by the exothermic carbon-oxygen reaction. In accordance with the present invention, it is considered essential that the $CO_2$ utilized in the reaction be obtained as an integral part of the process. The $CO_2$ is obtained from the initial product gases following their being subjected to a water gas shift reaction. Thus, no outside source of $CO_2$ is required. Further, another significant economic benefit obtained by the use of $CO_2$ in the reaction is that the oxygen and carbon requirements are reduced by up to about 50% and 25%, respectively, for a given amount of initial product gas. The proportion of carbon dioxide to oxygen employed in the feed mixture for this purpose ranges from about 0.6 to about 1.2 moles of carbon dioxide per mole of oxygen, preferably from about 0.8:1 to about 1:1.

It is particularly preferred that between 1 and 25 wt. % of alkali metal sulfide be present in the molten salt under steady-state conditions, the sulfide serving to catalyze the rate of partial combustion of the carbonaceous material. Any sulfate introduced or initially present in the melt is converted to sulfide under steady-state conditions. In addition to, or as an alternative to, the direct addition of sulfide to the melt, a carbonaceous material containing sulfur, e.g., sulfur-bearing coals or fuel oils, can also serve as a source of the sulfide. The temperature of the molten salt is maintained between about 1400 and about 2000° F, (about 760° to 1100° C), particularly between about 1600 and about 1800° F (about 870° to 980° C) where coal is the carbonaceous material. The result is a gaseous effluent from the gasification and combustion reactions which contains a substantially greater volume of CO than $CO_2$, at least 2:1, generally, about 4:1 and up to as high as 200:1, and which also contains other combustible gases such as hydrogen and hydrocarbons.

The sulfur and sulfur-bearing contaminants and ash present in the carbonaceous material or fuel, e.g., coal, are retained in the molten salt. The retention of the sulfur and ash from the fuel in the melt substantially reduces the requirement for a sulfur removal system or a hydrogen sulfide gas separator and may eliminate the need for an electrostatic precipitator. The sulfur and ash materials can be removed from the reaction zone with a continuous stream of molten salt. The contaminants may be removed from such a stream, and a regenerated stream of molten salt is returned to the reactor.

The retention of sulfur in the form of sulfides in the melt is assured by the use of oxygen in the absence of steam. Steam is employed in many prior art processes. Its elimination from the present process avoids formation of gaseous, sulfur-containing pollutants such as hydrogen sulfide, which would otherwise occur if steam were introducted into the molten salt during combustion of the carbonaceous material.

The resulting CO-rich gaseous effluent from the molten salt furnace, or a portion of such initial gaseous effluent, is next reacted with steam in a water gas shift reaction to produce hydrogen and carbon dioxide, unconverted carbon monoxide also generally being present. The carbon dioxide is separated from the product gas, and a substantial portion is recycled for admixture with oxygen as the feed gas to the primary combustion and gasification reaction in the molten salt furnace. By this means, hydrogen, carbon monoxide, or carbon dioxide, can be recovered individually as separate streams or products.

The water gas shift reaction can be carried out so as to result in a gaseous effluent product which may or may not cntain carbon monoxide, as well as hydrogen and carbon dioxide. The shift reaction can be carried out so as to produce a synthesis gas containing hydrogen and carbon monoxide in a molar ratio of 3:1. After removal of carbon dioxide from such gas mixture, and recycling a portion of the same for admixture with the oxygen feed to the molten salt furnace, the remaining hydrogen and carbon monoxide gas mixture can be methanated to produce a high BTU pipeline gas.

The water gas shift reaction also can be carried out under conditions to produce a hydrogen-rich gas, or a mixture of hydrogen and carbon monoxide containing a molar ratio of hydrogen to carbon monoxide of 2:1. Following removal of carbon dioxide from such gaseous effluent product, the remaining synthesis gas mixture of hydrogen and carbon monoxide can be reacted by catalytic synthesis to produce methanol, or, by means of a Fischer-Tropsch reaction, to form gasoline.

Gaseous oxygen, per se, is generally the preferred oxidant fed to the molten salt reaction zone, particularly where the synthesis gas obtained is to be converted to a high BTU pipeline gas. However, where synthetic ammonia is to be formed, oxygen-enriched air and carbon dioxide can be fed to the molten salt together with the coal or carbonaceous material. The proportion of oxygen present in such oxygen-enriched air, as well as the operating conditions, can be adjusted so that the product of the reaction is principally a mixture of nitrogen and carbon monoxide in the proper proportions, i.e., one mole of nitrogen to three moles of carbon monoxide, to subsequently produce ammonia. In the subsequent water gas shift reaction, the nitrogen and carbon monoxide mixture is reacted with steam to produce a mixture of nitrogen, hydrogen and carbon dioxide, the nitrogen and hydrogen being in a molar ratio of 1:3. After removal of carbon dioxide, and recycling thereof to the primary combustor containing the molten salt, the remaining mixture of nitrogen and hydrogen, in the molar proportions noted above, can be synthesized to form ammonia.

BRIEF DESCRIPTION OF THE DRAWINGS

The invention will be more clearly understood by reference to the detailed description below of certain preferred embodiments, taken in connection with the accompanying drawings, wherein.

DESCRIPTION OF THE PREFERRED EMBODIMENTS

Figure 1:
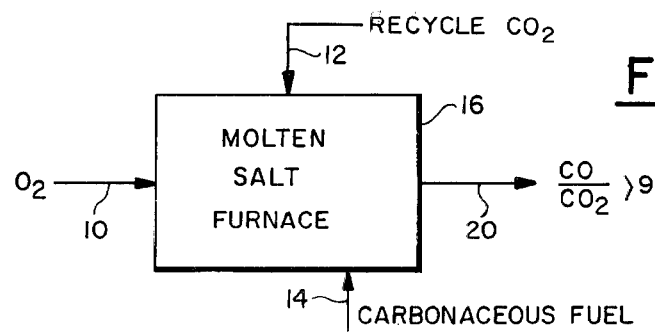
FIG. 1 is a generalized schematic flow diagram generally the process of the present invention.

In carrying out the process of the present invention, oxygen and recycled carbon dioxide from the process are introduced together with a carbonaceous fuel into a molten salt furnace containing the melt utilized in the process. In actual practice, the alkali metal carbonate salt, which may or may not initially contain sulfide, is usually fed separately to the furnace and brought to the molten state prior to introduction of the reactants. Generally, although not necessarily, the oxygen and carbon dioxide are introduced in the form of a mixture. The carbon dioxide employed is recycled carbon dioxide obtained from the water gas shift reaction to which the effluent gas containing chiefly carbon monoxide from the molten salt furnace is subsequently subjected. In order to particularly obtain an effluent gaseous product having a molar ratio of carbon monoxide to carbon dioxide substantially greater than 1, it has been found that the range of molar ratio of carbon dioxide to oxygen should be from about 0.6:1 to about 1.2:1, and preferably from about 0.8:1 to about 1:1, an optimum ratio being about 0.9:1.

The carbon dioxide reacts endothermically with carbon while oxygen reacts exothermically. Thus, complex cooling equipment for the removal of heat from the molten salt is thereby avoided, since the carbon dioxide represses the heat of the main reaction between oxygen and the carbon or coal. However, the employment of too great an amount of carbon dioxide together with oxygen in the molten salt furnace should be avoided in order to avoid too great a loss of heat. Hence, not more than about 1.2 moles of carbon dioxide per mole of oxygen should be employed.

An additional significant benefit of the incorporation of the recycled carbon dioxide in the molten salt furnace is that it decreases the amount of oxygen and carbon required per pound of product since, as previously noted, carbon dioxide reacts with carbon to produce carbon monoxide. Tests have shown that proper molten salt bed temperature control is readily obtainable when employing about a 1:1 molar ratio of oxygen to carbon dioxide. Ordinarily, in the absence of oxygen, the carbon would react with the molten alkali metal carbonate at the elevated temperatures employed. However, because of the presence of oxygen and carbon dioxide in the melt, this undesired reaction between carbon and the molten carbonate does not appear to occur.

Furthermore, the oxidation of carbon by carbon dioxide to produce carbon monoxide, while generally reported as being a relatively slow reaction, is much faster in the molten salt reaction zone. The increase in reaction rate is believed to be a catalytic effect of the sulfate-sulfide-containing molten carbonate salt system which operates during combustion of the carbonaceous material in the molten salt furnace, as pointed out in greater detail hereinafter. In addition, since carbon dioxide is a product of the subsequent shift reaction which takes place with the carbon monoxide-containing gas from the molten salt furnace, the recycle of a substantial portion of such carbon dioxide to the molten salt furnace increases the efficiency of the overall system.

Substantially pure oxygen is preferred for use in the process of the present invention. While oxygen-enriched air can be used, in conjunction with the recycled carbon dioxide for incorporation into the molten salt, this is not desirable, particularly when the product synthesis gas is to be upgraded to a high BTU pipeline gas, due to the undesirable presence of nitrogen in such oxygen-enriched air. However, where the gaseous product of the molten salt furnace is to be employed for the synthesis of ammonia, oxygen-enriched air containing nitrogen can be employed, so that following the subsequent water gas shift reaction, the resulting synthesis gas will also contain nitrogen which can then be reacted with the hydrogen in the synthesis gas under proper conditions for the production of ammonia.

Obviously, there must be provided a sufficient amount of oxygen to react with the carbonaceous material to form carbon monoxide, bearing in mind that, in addition to the oxygen introduced as $O_2$, each mole of $CO_2$ introduced into the reaction can contribute one-half mole of oxygen. The precise amount of oxygen and carbon dioxide required for optimum production of carbon monoxide will vary, depending upon, among other things, the amount of hydrogen or other oxidizable materials present in the carbonaceous feed material. In general, the combined oxygen and carbon dioxide will be provided in an amount of from about 60% to about 100% and preferably from about 66% to about 90% of the amount required to satisfy the following general equations where C is the amount of carbon in the feed material,

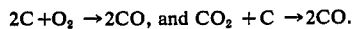

$$2C + O_2 \rightarrow 2CO, \text{ and } CO_2 + C \rightarrow 2CO.$$

In addition, it frequently may be necessary to supply a slight excess of oxygen, carbon dioxide or both to react with other oxidizable materials present in the feed. The optimum amount of $O_2$ and $CO_2$ supplied to obtain maximum CO production from any given feed may be determined by routine experimentation. Moreover, in some instances it may be desirable or advantageous to operate at other than optimum conditions for maximum CO production. For example, depending upon the furnace design, it may be necessary to obtain complete combustion of a substantial portion of the carbon in the feed in order to maintain a desired operating temperature in the reactor.

The oxygen and carbon dioxide separately, or a mixture thereof, and the carbonaceous material, preferably coal, are fed into the molten salt, which is maintained at a temperature generally ranging from about 1400° F to about 2000° F (about 760° to 1100° C). In preferred practice the temperature of the molten salt is maintained between about 1600° and about 1800° F (about 870° to 980° C). When the molten salt is principally sodium carbonate containing from about 1 to about 25 wt % sodium sulfide, a preferred temperature is from about 1600° to about 2000° F.

During operation of the process, it is necessary that the molten salt comprise a major portion of at least one alkali metal carbonate and a minor portion of at least 1 wt. % of an alkali metal sulfide. Particularly preferred is a molten salt consisting essentially of sodium carbonate containing from about 1 to 25 wt. % sodium sulfate. To provide such a molten salt mixture during process operation, the initial molten salt mixture can consist of alkali metal carbonate alone, or contain either alkali metal sulfate or sulfide. It preferably consists essentially of sodium carbonate containing from about 1 to 25 wt. % sodium sulfide or sodium sulfate, an amount between about 3 and 20 wt % sodium sulfate being particularly preferred. Alternatively, a binary or ternary mixture of the carbonates of sodium, potassium and lithium can be employed, a preferred binary mixture being the $Na_2CO_3$—$K_2CO_3$ eutectic. The sulfur compound may be added initially as sulfate, it being converted to sulfide under steady-state conditions. Any of the sulfates of the foregoing alkali metals may be utilized. Sodium sulfate is generally preferred because of its availability and low cost. The sulfur (as sulfide) content of the molten salt can also be furnished, either wholly or partially, from the sulfur content of the carbonaceous material, e.g., coal, employed so that alkali metal sulfate or sulfide need not then be added initially to the alkali metal carbonate.

Under the conditions of reaction in the present process, the sodium sulfide is believed to catalyze the combustion reaction by a complex reaction mechanism. While various exemplary intermediate reactions may be postulated, precise knowledge as to the details of the reaction mechanism is still lacking. Thus many different reactions occur between coal and oxygen, at least six of which are known, although their precise mechanism is uncertain. The added presence of the molten salt and its components provides still further complications. Thus, it is not intended that the present invention be considered limited by the following explanation.

The net overall reaction that occurs is the partial oxidation of the carbonaceous material or coal by oxygen and carbon dioxide. However, the combination of the oxygen and carbon is believed to occur indirectly in that each of such components reacts separately with a component present in the molten salt. Thus the oxygen is believed to react with sulfide present, converting it to sulfate; and the carbon is believed to react with the so-formed sulfate, reducing it to sulfide and forming carbon dioxide. Also, the combination of the carbon dioxide with the carbon is believed catalyzed by one or more components in the molten salt. Thus, the alkali metal sulfide, e.g., sodium sulfide, functions to increase the burning rate.

The alkali metal carbonate provides a compatible salt medium at practical operating temperatures and acts as a dispersing medium for both the fuel being combusted and the oxygen and carbon dioxide used for the combustion. In addition, the carbonate melt neutralizes the acidic pollutants, such as oxides of sulfur and chlorine-containing gases, formed in the partial oxidation reaction, and retains the resulting products. The carbonate melt also acts as a heat sink, with high heat transfer rates for absorbing and distributing the heat of combustion, as a heat source for the distillation of the volatile matter of the fuel, and as an absorbent for the ash from the fuel.

Many forms of carbonaceous materials, i.e., those providing an effective source of reactive carbon, can be used as the fuel or reductant in the process of this invention. Thus, all of the common forms of carbonaceous fuels can be used including coal, coke, fuel oil, petroleum crude, petroleum residue, lignite and peat. For purposes of the present invention, generally coal is the preferred carbonaceous material and coals having a high ash and sulfur content may be used. The present process is further advantageous in its ability to handle a wide variety of coals, including lignite, subbituminous, bituminous, and anthracite coals, without any need for pretreatment of caking coals.

In addition to the feed of a carbonaceous material, oxygen and recycled carbon dioxide, it is sometimes desirable to include an additional catalyst in the molten salt other than the alkali metal sulfide for the above reduction reaction. Iron compounds have been found to be good catalysts for this reaction. An amount of iron ranging from about 0.5 to about 3 wt % of the melt is preferred. The iron can be added in the elemental form or, preferably, in the form of compounds containing iron, such as iron sulfide or iron sulfate.

During operation of the partial combustion reaction in the molten salt mixture, impurities present in the carbonaceous material are retained in the melt. The amount and type of impurities present in the melt will vary depending upon the source of carbonaceous material or feed. The most common impurities are ash and sulfur, the sulfur generally being present as a sulfur compound such as sodium sulfide in the melt. To remove such impurities, a portion of the alkali carbonate melt is withdrawn either intermittently or continuously and processed in a regeneration system which removes the ash and sulfur compounds retained in the melt and returns the regenerated sodium carbonate back to the molten salt furnace. A typical impurity removal process for this purpose is described in above U.S. Pat. Nos. 3,710,737 and 3,708,270.

The effluent gas mixture from the partial combustion reaction in the molten salt contains carbon monoxide and carbon dioxide having a molar ratio of CO to $CO_2$ substantially greater than 1, of at least 2:1 and generally ranging from a molar ratio of about 4:1 up to as high as 200:1. It is, of course, desirable to obtain as high a ratio of CO to $CO_2$ as possible, such ratio in usual practice generally ranging from about 4:1 to about 20:1. A combustible gaseous effluent according to the invention can contain, for example, from about 90 to about 95% CO and about 5 to about 10% $CO_2$, by volume, based on these two components. Where coal is employed, the effluent gas will also contain hydrogen and hydrocarbons, including methane and ethane. It has been found that CO concentrations in the gaseous effluent will increase with: (1) use of preferred or optimum ratios of $CO_2$ to CO as described above, (2) increasing carbon content in the melt, (3) controlled or optimum temperatures of reaction, and (4) increasing sulfide content of the melt. The carbon content of the melt can range, for example, from about 1 to about 10 wt %, and preferably is within the range of from about 3.5 to about 7.5 wt %.

Where coal is employed as the carbonaceous material, together with a mixture of oxygen and carbon dioxide according to the invention, the effluent gas containing the above noted high ratios of carbon monoxide to carbon dioxide can have a BTU content that can range from about 250 to about 325 BTU per cubic foot.

The molten salt combustion system is operated at a pressure of from 1 up to about 100 atmospheres. Thus, preferred pressures can range, for example, between 5 and 30 atmospheres, but for more efficient operation, pressures are particularly maintained in the upper portions of the above range, e.g., between about 10 and about 30 atmospheres. By operating at pressures above atmospheric, a higher throughput of coal, oxygen and carbon dioxide is obtained than at atmospheric pressure. Thereby, the combustion reaction can be accomplished in a smaller vessel for a given rate of coal feed to the vessel. The molten salt furnace can be operated at pressures up to 100 atmospheres. At such higher pressures, however, the equilibrium balance between CO and $CO_2$ favors the formation of $CO_2$. The preferred pressures, therefore, are from about 5 to 30 atmospheres.

Referring to FIG. 1 of the drawing, oxygen at 10 and $CO_2$ at 12, e.g., in the form of a gas mixture, and a carbonaceous feed material at 14, such as coal, are supplied to a molten salt furnace or reactor 16 containing an $Na_2CO_3$—$Na_2S$ melt. The mixture of oxygen and $CO_2$ may be introduced in the bottom portion of the reactor zone so as to pass upwardly through the melt and thereby provide for an intimate mixing of the oxygen, $CO_2$, coal, and molten salt. The heat generated by the oxidation reaction between the oxygen and the coal is sufficient to maintain the melt in the molten condition within the desired temperature ranges noted above for effective partial oxidation and substantially complete gasification of the carbonaceous fuel according to the invention. As previously noted, the $CO_2$ aids in control of furnace temperature by absorbing heat as a result of the endothermic reaction between carbon and $CO_2$.

A combustible gaseous effluent leaves the molten salt furnace 16 by way of a conduit 20 and contains CO and $CO_2$, in a desired volumetric ratio of CO to $CO_2$, e.g., >9:1. This effluent gaseous product can then be fed to a work expander or turbine to reduce the pressure thereof, after which the cooled and expanded gas is subjected to a water gas shift reaction to produce a $CO_2$-containing gaseous product. In accordance with the present invention, this gaseous product of the shift reaction is subjected to a separation process to recover $CO_2$ for recycle to the gasifier and to provide a synthesis gas that can be methanated to form a high BTU pipeline gas, or subjected to a methanol synthesis for production of methanol.

Figure 2:
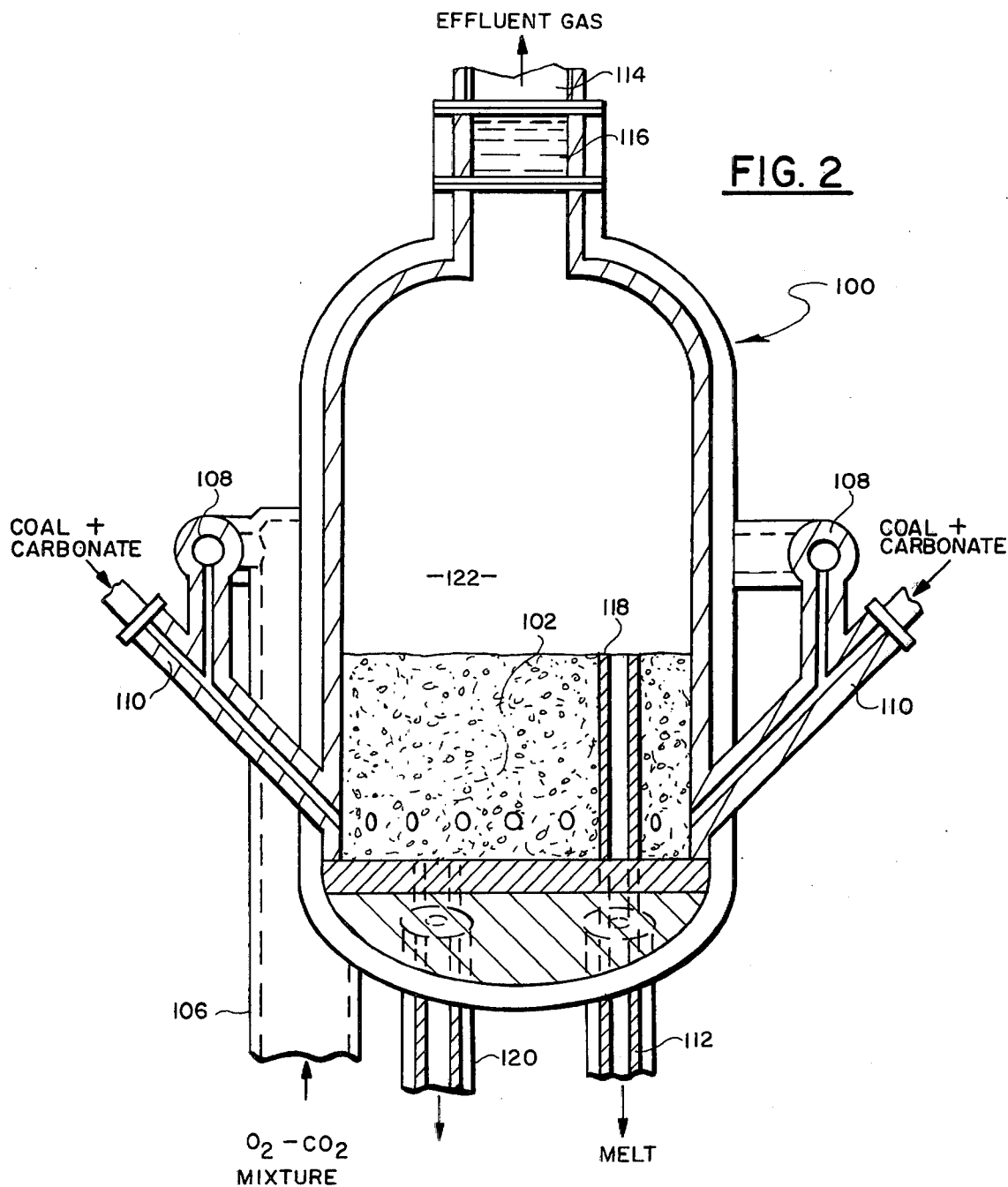
FIG. 2 is an elevational view, partly in section, of a preferred form of furnace containing the molten salt.

Referring now to FIG. 2 of the drawing, there is illustrated a type of molten salt gasification furnace which can be employed in the invention process. A furnace or reactor vessel 100 contains a body of molten salt 102, e.g., comprising sodium carbonate and 1 to 25 wt % sodium sulfide. There is provided an inlet 106 for a mixture of $O_2$ and $CO_2$, a manifold distributor system 108 for such gas mixture, and coal inlets 110, the inlet gas manifold and coal inlets being interconnected. The coal inlets can also serve for introduction of alkali metal carbonate into the reactor. The reactor is also provided with a melt outlet 112 and a gas outlet 114.

The outlet 114 is provided with a demister 116 for removing liquid and solid particulates from the effluent gas. The reactor is also provided in the interior thereof with an overflow weir 118, to maintain a constant level of molten salt, and a drain 120. The mixture of oxygen and carbon dioxide is supplied to the reaction zone 122 containing the salt melt 102 through the inlet feed gas distributor system 108.

Under the conditions of reaction, according to the present invention, partial oxidation of the coal occurs in the molten salt 102 contained in reaction zone 122. The gaseous effluent exiting the reactor at 114 contains at least a 4:1 molar ratio of carbon monoxide to carbon dioxide, together with hydrogen, hydrocarbons and water.

As the reaction proceeds in the molten salt body 102, acidic contaminants such as sulfur or sulfur-bearing materials in the carbonaceous material or coal pass into the molten salt, the sulfur-bearing materials forming alkali metal sulfides such as sodium sulfide. It is noteworthy that in the invention process employing oxygen and $CO_2$ as feed gas, in the absence of steam, no noxious, gaseous sulfides such as $H_2S$ are formed.

The capacity of the salt melt for retaining solids (coal, sulfur and ash) is limited by the maximum allowable concentration of these materials in the melt. Generally, the total solids concentration of the carbonate melt should not be allowed to exceed about 25 wt % thereof and preferably is maintained at less than about 20 wt %. At higher concentrations it becomes difficult to remove the melt for regeneration. Before such concentration is reached a steady-state condition is established by withdrawal of a side stream 112 of sulfur- and ash-containing melt and addition of regenerated sodium carbonate or sodium carbonate makeup back into the molten salt furnace. This side stream is quenched in water, which dissolves the sodium carbonate and soluble sulfur compounds. The insoluble ash and any uncombusted carbon are removed from the solution by clarification and/or filtration, preferably in the presence of $CO_2$ to decrease silicate formation. Carbonation of the filtrate with flue gas and steam stripping ae employed to regenerate the sodium carbonate and release hydrogen sulfide. The hydrogen sulfide is processed in a conventional manner for recovery of elemental sulfur or sulfuric acid. The sodium carbonate is crystallized out of its water solution, and, after addition of makeup carbonate, is returned to the molten salt furnace.

Operation of the molten salt furnace at relatively low pressures, e.g., a pressure just above ambient, has the disadvantage that it requires a molten salt furnace having a large cross section, since the controlling parameter involved is the superficial velocity of the fuel gas generated. To decrease the cross section of the molten salt furnace, operation of this furnace can be carried out under pressure. Typically, for example, a pressure of 5 atmospheres will decrease the diameter of the furnace by a factor of 2.2. The amount of energy required to compress the primary air feed is, however, appreciable and, for economic reasons, it is important that this energy be recovered by expanding the off-gas from the molten salt furnace through a gas turbine.

Figure 3:
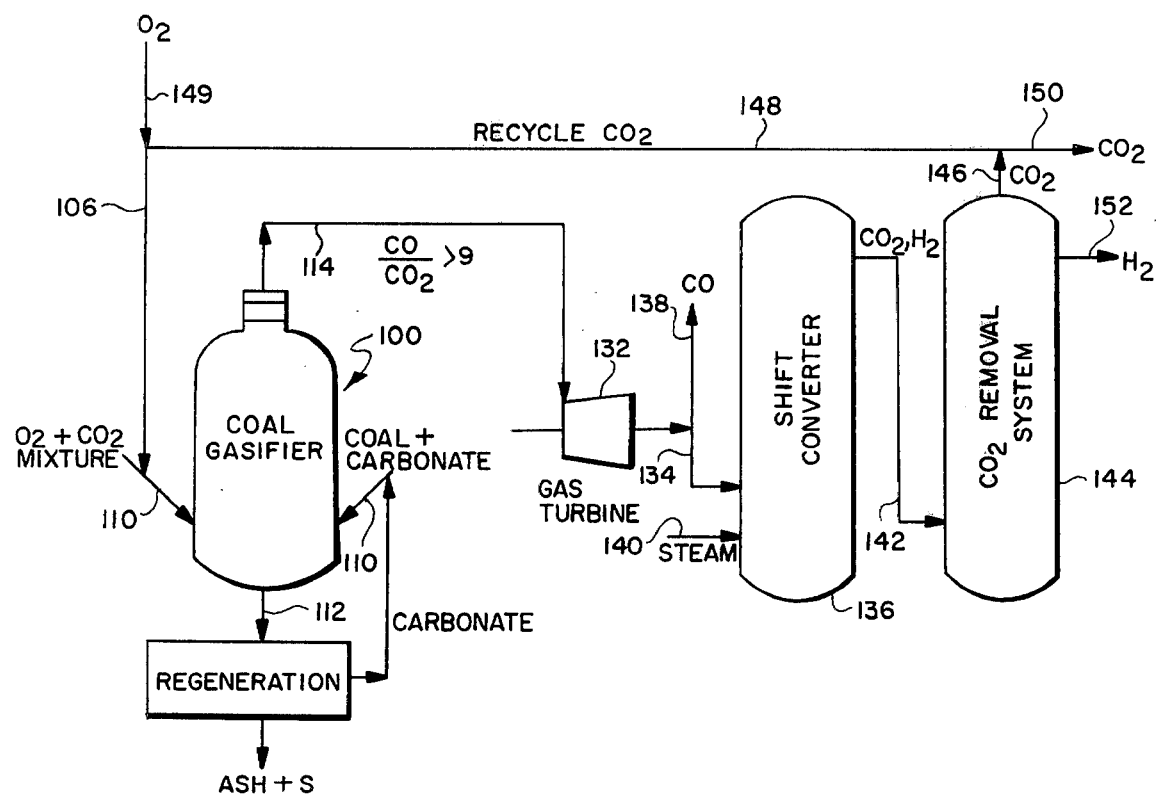
FIG. 3 is a schematic flow diagram of an embodiment of the invention for production of CO and/or $H_2$.

Referring now to FIG. 3 of the drawing, there is illustrated an embodiment of the invention for production of carbon monoxide and hydrogen, or of essentially hydrogen only, if desired. Thus, the gaseous effluent 114 from the molten salt coal gasifier 100 contains a molar ratio of CO to $CO_2$ preferably greater than 9, and also methane and hydrogen, and is preferably under a pressure of at least 5 atmospheres. This gaseous effluent is passed through an expander or gas turbine 132, and the energy recovered from the expander can be employed for compressing the initial feed of oxygen and carbon dioxide to the coal gasifier. The resulting expanded gas discharged from turbine 132 at a reduced pressure and temperature can then be introduced at a conduit 134 into a shift converter 136 for carrying out a water gas shift reaction. If desired, a portion of the gas discharged from turbine 132, and essentially consisting of CO, can be discharged by way of a conduit 138 for other use.

In carrying out the water gas shift reaction in the shift converter 136, steam is introduced by way of a conduit 140 into the shift converter together with the carbon monoxide-containing gaseous effluent at conduit 134. The water gas shift reaction is a slightly exothermic reaction which is not affected by pressure but is benefited by the employment of lower temperatures. Thus, the water gas shift reaction can be carried out at temperatures ranging from about 345° to about 425° C and at pressures ranging from atmospheric up to about 400 psig., employing an iron oxide-chromic oxide catalyst. The shift reaction can also be carried out at lower temperatures, e.g., ranging from about 175° to about 345° C and at pressures ranging from about atmospheric to 350 psig employing a copper, chromium and zinc oxide catalyst. The low-temperature catalyst is more sensitive to sulfur poisoning and deactivation by use of too high a temperature than is the higher temperature catalyst.

The gaseous effluent leaves the shift converter 136 through a conduit 142 substantially increased in hydrogen content and consists essentially of $CO_2$ and $H_2$. This effluent gas is next subjected to a $CO_2$ removal process such as by introduction into a $CO_2$-removal system 144 employing a hot carbonate process, an META (monoethanolmine) process, or other standard $CO_2$ removal process. The $CO_2$ removed by way of a conduit 146 from the system 144 is recycled by way of a conduit 148 for introduction, together with oxygen from a conduit 149, in the proper molar proportions noted above, into the molten salt furnace or coal gasifier 100 by way of conduits 106 and 110. Any remaining portion of $CO_2$ can be vented by way of a conduit 150 or used for other purposes. The hydrogen separated in the $CO_2$-removal system 144 and discharged through a conduit 152 is then used for any desired purpose.

Figure 4:
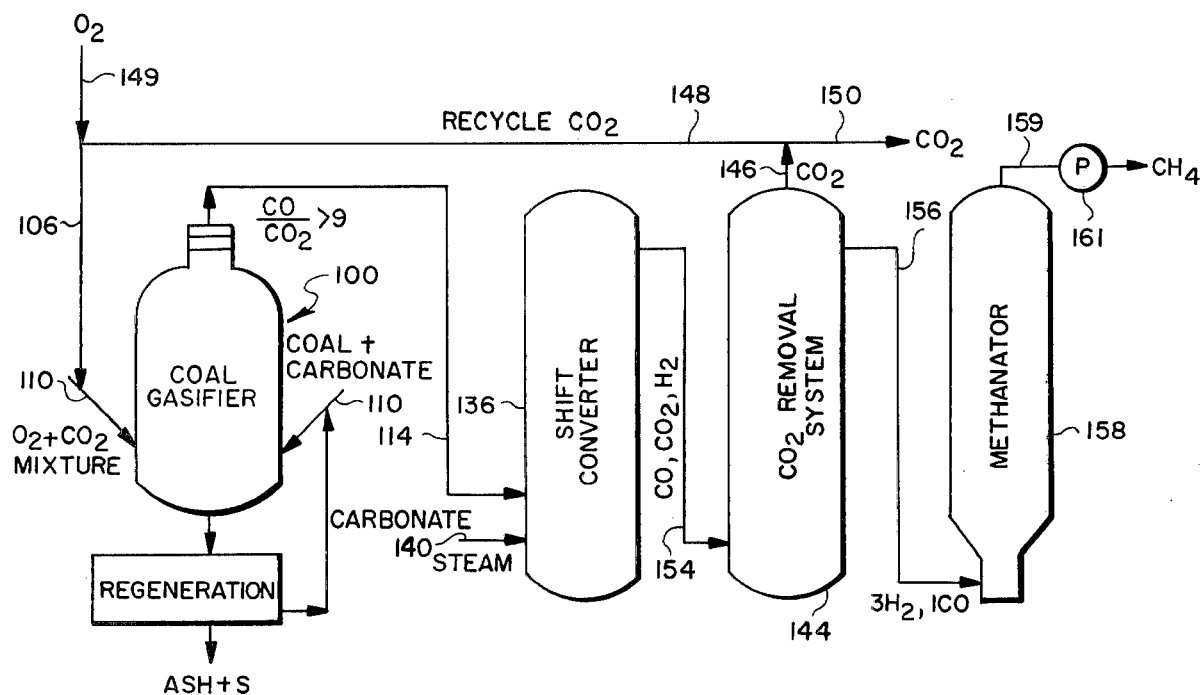
FIG. 4 is a schematic flow diagram of another embodiment of the invention for production of a high BTU pipeline gas.

Now referring to FIG. 4, the water gas shift reaction can be carried out so as to result in a gaseous effluent which may or may not contain carbon monoxide, as well as hydrogen and carbon dioxide, depending on the intended end use of the gas. Thus, there is illustrated a preferred embodiment of the invention for production of a high BTU pipeline gas involving the carrying out of the shift reaction so that a substantial proportion of CO is present in the gaseous effluent. As shown in FIG. 4, the gaseous effluent from the coal gasifier 100 and preferably containing a molar ratio of CO to $CO_2$ greater than 9, together with hydrogen and hydrocarbons, is reacted with steam in the shift converter 136. The reaction is carried out under conditions such as to produce a gas at 154 containing CO, $CO_2$ and $H_2$ with a molar ratio of $H_2$ to CO of 3:1. This gaseous mixture is introduced into the $CO_2$-removal system 144 for removal of $CO_2$. A portion of the $CO_2$ is recycled by conduit 148 and mixed with oxygen from conduit 149 in proper molar proportion for introduction of such gas feed into the coal gasifier 100; any remaining $CO_2$ is vented by conduit 150.

The separated effluent synthesis gas from system 144, discharged by way of a conduit 156, is a purified gaseous mixture containing a molar ratio of hydrogen to carbon monoxide of 3:1. This gaseous mixture is then introduced into a methanator 158. The synthesis gas methanation reaction in methanator 158 can be carried out over a fixed-bed or fluid-bed nickel-based catalyst which promotes the interaction of hydrogen and carbon monoxide to methane. The overall reaction is exothermic, and the reaction can be carried out, for example, at about 400° C on a continuous basis, the gas finally emerging from a conduit 159 having a methane content of 90 to 95% and an energy content ranging from about 980 to about 1,000 BTU. The reaction can be carried out under pressure, ranging from about 15 to about 1000 psig. Since the methanation reaction is favored by pressure, the pressurized gaseous effluent from the coal gasifier at 100 can be introduced directly into the shift converter 136 without prior expansion to a lower pressure in a gas turbine, as in the case of the embodiment shown in FIG. 3. The effluent pipeline gas from conduit 159 can be pressurized by a pressurizer 161.

Figure 5:
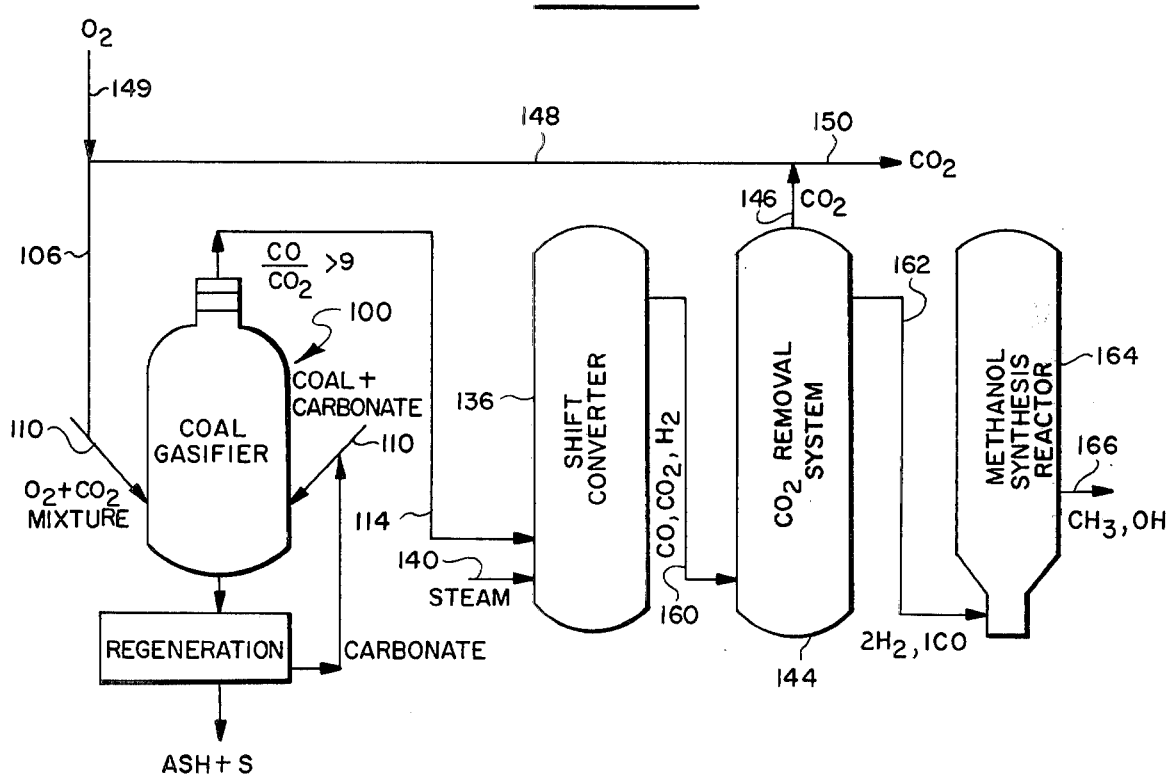
FIG. 5 is a schematic flow diagram of still another embodiment of the invention for production of methanol.

In FIG. 5 is illustrated the use of the effluent gas from the molten salt furnace for production of a synthesis gas utilized for methanol synthesis. Referring to FIG. 5, the reaction in the shift converter 136 between steam and the feed gas 114 from the molten salt coal gasifier 100 is carried out under conditions to produce a mixture of hydrogen and carbon monoxide in a molar ratio of 2:1, together with carbon dioxide. This effluent gas leaving the shift converter by way of a conduit 160 is then passed to the system 144 for removal of $CO_2$. A portion of the $CO_2$ then is recycled for admixture with oxygen in the proper molar proportions, as noted above, for introduction into the molten salt coal gasifier 100.

The product synthesis gas from system 144, containing a purified mixture of 2 moles of hydrogen for each mole of carbon monoxide, is led by way of a conduit 162 into a final stage reactor 164 for catalytic synthesis to methanol.

Various catalytic methanol synthesis processes have been developed involving reaction of hydrogen and carbon monoxide. Thus, a high pressure process can be utilized employing pressures ranging from about 40 to about 100 atmospheres and at temperature of about 200° to about 300° C, utilizing zinc-chromium catalyst. Reaction at lower pressures can also be carried out employing copper-based catalyst. Here again, since the methanol reaction is carried out under pressure, expansion of the gaseous effluent from the coal gasifier to reduce the pressure thereof can be avoided so that the gaseous effluent is under sufficient pressure following the shift reaction and scrubbing for introduction into the methanol synthesis reactor 164. The methanol product is discharged from reactor 164 by way of a conduit 166.

If desired, the process of the present invention can also be employed for synthesis of ammonia. This can be accomplished by employing, for example, oxygen-enriched air and carbon dioxide as feed gas to the molten salt reactor. The proportion of oxygen present in the feed gas is adjusted so that the product of the reaction is principally a mixture of nitrogen and CO in a ratio of 1 mole of nitrogen per three moles of carbon monoxide. This gas can then be subjected to a water gas shift reaction with steam in two stages. A conventional high temperature catalyst is used in the first stage at a temperature of about 800° F, and a low temperature shift catalyst is used in the second stage at a temperature of about 500° F. The shift reaction product will then contain nitrogen, hydrogen and carbon dioxide in a molar ratio of 1:3:3. This product gas can then be passed to a carbon dioxide removal system to remove the carbon dioxide for recycle to the molten salt furnace. After $CO_2$ removal, the remaining synthesis gas containing nitrogen and hydrogen in a molar ratio of 1:3 is then subjected to ammonia synthesis in a converter. Catalytic synthesis of ammonia in the converter can take place at varying pressures which can range, for example, from about 2,000 to 4,500 psig.

If desired, the embodiment illustrated in FIG. 4 for production of methanol can be modified to produce from the shift conversion a gaseous effluent containing a molar ratio of hydrogen to carbon monoxide of 2:1, which can be subjected to a Fischer-Tropsch reaction to produce gasoline instead of methanol.

It will be understood that all of the various synthesis reactions described above and illustrated in FIGS. 4 and 5 for production of methane, methanol, ammonia or gasoline are known reactions and per se form no part of the present invention other than that the present process provides ready means for producing a synthesis gas of desired composition.

The following examples illustrate the practice of the invention, it being understood that such examples are not intended as limitations of the invention.

EXAMPLE 1

A test was run on the combustion of Illinois coal char employing oxygen in combination with $CO_2$ for combustion. The test was run in a 4-inch depth molten salt bed contained in a 1½ inch ID alumina tube immersed in an electric furnace. The salt bed utilized in this test had a composition of 88% sodium carbonate and 12% sodium sulfide.

The coal was ground and dried before being introduced into the molten salt mixture. A feed gas consisting of 33% $CO_2$ and 67% $O_2$, by volume (0.5 mole $CO_2$/mole $O_2$), was introduced at a superficial velocity of 0.5 ft/sec. At the beginning of the test the amount of coal added to the molten salt bed was sufficient to provide about 10% fixed carbon content, and the carbon was all consumed in the course of the test. Temperature of the molten salt bed during the test ranged from 1700° to 1859° F. The test was carried out over a period of 14 minutes. Samples of the discharge gas from the molten salt reactor were taken at 2-minute intervals for analysis of the gas.

The results of these tests are shown in Table 1. From this table it is seen that after a sharp rise in temperature in the first two minutes of the run, the temperature remained substantially constant. Also, the conversion of $CO_2$ to CO was excellent, and the exit gas still contained greater than 90% by volume CO when the carbon content of the melt was down to 4.7% by weight of the melt. During this latter period, carbon content of the melt ranged from 4.7 to 9.9%, and the $CO/CO_2$ ratio ranged from 10:1 to 30:1.

TABLE 1

Combustion of Illinois Coal Char in an 88% $Na_2CO_3$ and 12% $Na_2S$ Melt With 33% $CO_2$ at 0.5 ft/sec

| Sample No. | Time (min) | Temp (° F) | Percent CO (volume) | Percent $CO_2$ (volume) | $CO/CO_2$ Ratio (mole) | Percent $O_2$ | Carbon Content of Melt, $O_2$ Balance Calculated (%) |
|---|---|---|---|---|---|---|---|
| — | 0 | 1700 | — | — | — | — | 9.9 |
| 1 | 2 | 1886 | 96.7 | 3.3 | 30 | <0.1 | 9.9 |
| 2 | 4 | 1895 | 95.3 | 4.7 | 20 | <0.1 | 8.2 |
| 3 | 6 | 1868 | 94.0 | 6.0 | 16 | <0.2 | 6.4 |
| 4 | 8 | 1868 | 91.0 | 9.0 | 10 | <0.1 | 4.7 |
| 5 | 10 | 1868 | 88.6 | 11.4 | 8 | <0.1 | 3.1 |
| 6 | 12 | 1872 | 83.3 | 16.7 | 5 | <0.1 | 1.5 |
| 7 | 14 | 1859 | 74.9 | 25.1 | 3 | <0.2 | 0 |

EXAMPLE 2

A test was run employing Illinois No. 6 Seam Coal, River King Mine, having the following analysis:

| Constituent | Weight Percent |
|---|---|
| Carbon | 60.20 |
| Hydrogen | 4.30 |
| Nitrogen | 1.18 |
| Sulfur | 3.23 |
| Ash | 11.17 |
| Volatile Matter | 35.75 |
| Moisture | 10.50 |
| Fixed Carbon | 42.58 |

The test was carried out in a 6-inch diameter bench scale test unit containing a salt bed having the approximate composition 40% sodium carbonate, 29% potassium carbonate, 12% of combined sodium and potassium sulfides, 15% ash, 1% combined sodium and potassium chlorides, and 3% unburned carbon. The quiescent bed height was about 6 inches.

The coal was ground with a hand-turned burr mill and fed to the molten salt reactor using a ½-inch diameter screw feeder. An approximate size analysis for the coal fed was 20% -8 × 10 mesh, 45% -10 × 20 mesh, 20% -20 × 40 mesh, and 15% -40 mesh. Carbon content of the molten salt bed during the test ranged from about 3% to about 4% by weight of the bed.

Cylinder oxygen and carbon dioxide were measured with rotameters and passed through a mixing device, so as to feed a 50/50 volumetric mixture of oxygen and carbon dioxide (1.0 mole $CO_2$/mole oxygen) to the molten salt reactor. The oxygen and carbon dioxide rates were each 0.31 scfm, and the coal feed rate was 21.95 grams/min. The superficial velocity of the exit gas was approximately 0.5 ft/sec. The test was carried out for a period of 35 minutes. The results of this test are set forth in Table 2. From this table it is seen that the $CO/CO_2$ ratio of the exit gas varied from 4.2:1 to 4.6:1, and the higher heating value of the exit gas varied from 291 to 314 BTU/scf. Melt temperatures during the test ranged from 1661° to 1733° F.

TABLE 2

| Time (min) | Melt Temp (° F) | Volume Percent | | | | | | Higher Heating Value (Btu/cu ft) | $CO/CO_2$ Ratio (mole) |
| --- | --- | --- | --- | --- | --- | --- | --- | --- | --- |
| | | CO | $CO_2$ | $O_2$ | $CH_4$ | $C_2H_6$ | $H_2$ | | |
| 0 | 1661 | — | — | — | — | — | — | — | — |
| 5 | 1733 | 68.5 | 16.5 | 0.0 | 2.0 | 0.3 | 14.2 | 291 | 4.2 |
| 15 | 1733 | 70.1 | 15.3 | 0.0 | 2.0 | 0.3 | 19.3 | 314 | 4.6 |
| 25 | 1733 | 70.5 | 15.6 | 0.0 | 2.0 | 0.3 | 19.3 | 314 | 4.5 |
| 35 | 1724 | 66.2 | 15.9 | 0.0 | 2.0 | 0.4 | 16.3 | 293 | 4.2 |

EXAMPLE 3

The procedure of Example 2 was substantially followed in running another set of tests employing Illinois No. 6 Seam Coal, and the test unit and molten salt mixture contained therein, as in Example 2 above. Also, a 50/50 volumetric mixture of oxygen and carbon dioxide was employed.

TABLE 3

| Time (min) | Melt Temp (° F) | Volume Percent | | | | | | Higher Heating Value (Btu/cu ft) | $CO/CO_2$ Ratio (mole) |
| --- | --- | --- | --- | --- | --- | --- | --- | --- | --- |
| | | CO | $CO_2$ | $O_2$ | $CH_4$ | $C_2H_6$ | $H_2$ | | |
| 0 | 1666 | — | — | — | — | — | — | — | — |
| 5 | 1666 | 55.3 | 13.9 | 0.0 | 2.5 | 0.4 | 23.0 | 302 | 4.0 |
| 15 | 1661 | 62.9 | 9.2 | 0.0 | 2.2 | 0.4 | 24.6 | 320 | 6.8 |
| 25 | 1652 | 57.8 | 13.1 | 0.0 | 2.2 | 0.4 | 24.2 | 301 | 4.4 |
| 30 | | Coal and gas rates doubled | | | | | | | |
| 35 | 1643 | 54.8 | 16.2 | 0.0 | 2.0 | 1.1 | 25.4 | 299 | 3.4 |
| 40 | 1625 | 56.1 | 14.6 | 0.0 | 2.0 | 0.5 | 25.4 | 292 | 3.8 |
| 50 | 1661 | 55.8 | 15.4 | 0.0 | 2.0 | 0.5 | 24.6 | 288 | 3.6 |

In these tests, two different gas and coal feed rates were employed. In the first 30 minutes of the test, oxygen and carbon dioxide rates were each 0.31 scfm and the coal feed rate was 24.5 grams/min, with a superficial velocity of the exit gas of about 0.5 ft/sec. This was followed by a 20 minute test in which oxygen and carbon dioxide rates each were doubled to 0.62 scfm and the coal feed rate was doubled to 49 grams/min, with a superficial velocity of the exit gas doubled to 1 ft/sec.

The results of these two tests are set forth in Table 3. It is noted from this table that in the first 30-minute test at 0.5 ft/sec, the $CO/CO_2$ molar ratio of the exit gas varied from 4.0:1 to 6.8:1, and the higher heating value of the exit gas ranged from 301 to 320 BTU/scf. Temperature during this test was relatively constant, from 1652° to 1666° F.

In the second 20-minute test at 1 ft/sec, the $CO/CO_2$ molar ratio varied from 3.4:1 to 3.8:1 and the higher heating value of the exit gas ranged from 288 to 299 BTU/scf. Temperature during this test ranged from 1616 to 1643° F. A sample of the molten salt bed was analyzed after this test and was found to contain 4.56% carbon.

The decrease in conversion of $CO_2$ to CO with increase in velocity in the second 20-minute test was due to a decrease in contact time and indicates that deeper molten salt beds of larger scale units will produce even better conversion than observed in the present test.

Examples 1 to 3 indicate that the use of $CO_2$ in admixture with oxygen in the feed gas tends to maintain a relatively constant salt bed temperature during coal gasification therein. A second advantage of the presence of $CO_2$ together with oxygen in the feed gas is that it decreases the amount of oxygen required per pound of coal gasified. Thus, conversion of $CO_2$ to form CO during gasification in the molten salt bed is good, as shwon in the above examples. Further, the maintenance of proper molar ratios of $CO_2$ to $O_2$ in the feed gas and the maintenance of suitable carbon concentration in the molten salt during gasification result in an effluent gas from the molten salt furnace having a molar ratio of carbon monoxide to carbon dioxide substantially greater than 1, and which can be greater than 9:1.

EXAMPLE 4

The following example is set forth to illustrate a particularly preferred embodiment of the present invention, such as set forth in FIG. 4, wherein coal is gasified and processed to produce a high BTU pipeline quality gas. Illinois No. 6 Seam coal havin the analysis as set forth in Example 2 is introduced into the gasifier at the rate of 10,000 lbs/hr. The molten salt utilized in the gasifier comprises 7,500 lbs of sodium carbonate having a carbon content of 4–5% and containing about 12% of sodium sulfide. Also introduced into the gasifier are 5,000 lbs/hr of oxygen and 6,200 lbs/hr of cabon dioxide. The feed rates of oxygen and carbon dioxide provide a molar ratio of oxygen to carbon dioxide of about 1.1, which molar ratio is sufficient to provide a steady-state temperature within the salt is continuously withdrawn at a rate of 7,000 lbs/hr for regeneration (ash and sulfur removal) and returned to the gasifier.

A product gas is generated at the rate of about 14,700 lbs/hr and upon analysis is found to be substantially free of sulfur and has the following composition: 705 CO, 6% CO2, 6% $CH_4$, and 18% $H_2$. The product gas is introduced into a water gas shift converter which is operated to provide an effluent gas having a mole ratio of hydrogen to carbon monoxide of 3:1. specifically, the water gas shift converter is maintained at a temperature of about 420° C and a pressure of about 400 psig. An iron-chromium catalyst is utilized. steam is introduced into a shift converter at the rate of 10,500 lbs/hr to provide an effluent gas having the desired molar ratio of hydrogen to carbon monoxide, i.e., 3:1.

The effluent gas from the water gas shift converter then is passed to a carbon dioxide removal process to provide a desired synthesis gas. Specifically, the effluent gas is scrubbed with hot potassium carbonate to remove the carbon dioxide from the gas stream. The carbon dioxide is absorbed by the potassium carbonate, which subsequently is heated to drive off carbon dioxide and regenerate the potassium carbonate.

Carbon dioxide is recovered from the process in an amount of 13,250 lbs/hr, thus providing an excess over that required for recycle to the process. The excess carbon dioxide is vented to the atmosphere or used for any desired purpose. The effluent synthesis gas from the $CO_2$ removal process is introduced into the methanator which is maintained at a temperature of about 400° C at a pressure of about 400 psig. The catalyst utilized is Raney Nickel. The product gas leaves the methanator at the rate of about 2,200 lbs/hr and contains 95% methane. Small amounts of $C_2H_6$, CO, $CO_2$, and $H_2$ also are present.

Thus, the foregoing example demonstrates the gasification of coal to produce a pipeline quality high BTU gas (about 960 BTU/scf) in accordance with the present invention, wherein the coal is gasified with a mixture of oxygen and $CO_2$, the $CO_2$ being obtained from the process and recycled to the gasifier.

From the foregoing, it is seen that the invention provides an efficient improved procedure for production of a gas of relatively high BTU content by a molten salt combustion process for carbonaceous materials, particularly coal. An important and basic feature of the invention is that carbon dioxide formed in the shift reaction is separated and a portion recycled for introduction together with oxygen into the molten salt furnace, thus providing temperature control and decreasing the oxygen and fuel requirements for a given amount of the initial effluent gas.

It will be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practices otherwise than as specifically illustrated and described.

We claim:

1. A process for producing a synthesis gas capable of being upgraded to a pipeline gas, which process comprises:

providing a reaction zone containing a molten salt consisting essentially of a major portion of sodium carbonate and a minor portion of at least 1 wt.% of sodium sulfide, said molten salt containing carbon in an amount of about 1 to 10% by weight of the molten salt and having a total solids concentration of less than about 25 wt.%, maintaining said molten salt at a temperature between about 1400° and 2000° F, introducing a sulfur-containing carbonaceous material, substanially pure oxygen, and recycled carbon dioxide from the process into said molten salt reaction zone, said substantially pure oxygen and carbon dioxide being introduced in an amount sufficient to provide about 0.6 to about 1.2 mole of carbon dioxide per mole of oxygen, controlling the foregoing conditions without the introduction of steam to promote CO production and decompose said carbonaceous material, whereby the sulfur component of the carbonaceous material is retained in the molten salt, the reaction being carried out at a pressure between 1 and 100 atmospheres, obtaining from said reaction zone an initial gaseous effluent containing carbon monoxide, hydrogen, hydrocarbons and carbon dioxide, and being essentially free of sulfur-containing pollutants, subjecting said gaseous effluent to a water gas shift reaction, recovering a resultant gaseous mixture of carbon dioxide, carbon monoxide and hydrogen from said shift reaction, removing the carbon dioxide from said resultant gaseous mixture, recycling a portion of said carbon dioxide for introduction thereof into said molten salt reaction zone, and separately recovering from the carbon dioxide removal process a substantially carbon-doxide-free synthesis gas capable of being upgraded to a pipeline gas.

2. A process as defined in claim 1, wherein said ratio of carbon dioxide to oxygen is between about 0.8 and about 1.1 mole of carbon dioxide per mole of oxygen.

3. A process as defined in claim 2, wherein said molten salt contains carbon in an amount of about 3.5 to about 7.5% by weight of the melt composition.

4. A process as defined in claim 3, wherein the molar ratio of carbon monoxide to carbon dioxide in said initial gaseous effluent is at least 9:1.

5. The process as defined in claim 2, wherein said temperature is between about 1600° and about 1800° F.

6. The process as defined in claim 1, wherein said carbonaceous material is selected from the group consisting of coal, coke, fuel oil, petroleum crude, petroleum residue, lignite and peat.

7. The process as defined in claim 1, wherein said carbonaceous material is coal, said process is carried out at a pressure between about 5 and about 30 atmospheres, and said initial gaseous effluent contains carbon monoxide, hydrogen and hydrocarbons as principal combustible components, together with carbon dioxide.

8. The process as defined in claim 7, wherein said molten salt is at a temperature between about 1600° and about 2000° F.

9. The process as defined in claim 1, wherein said water gas shift reaction is carried out so that the molar ratio of hydrogen to carbon monoxide in said gaseous mixture from said water gas shift reaction is about 3:1, and wherein, following said removal of carbon dioxide from said gas mixture, the resultant synthesis gas has a molar ratio of hydrogen to carbon monoxide of about 3:1 and is subjected to methanation, and wherein a pipeline gas consisting essentially of methane is recovered.

10. A process as defined in claim 1, wherein said water gas shift reaction is carried out so that the molar ratio of hydrogen to carbon monoxide in said gaseous mixture from said water gas shift reaction is about 2:1, and wherein, following said removal of carbon dioxide from said gaseous mixture, the resultant synthesis gas has a molar ratio of hydrogen to carbon monoxide of about 2:1 and is subjected to catalytic synthesis for production of methanol.

11. The process as defined in claim 8, wherein said molten salt contains carbon in an amount of about 3:5 to about 7.5% by weight of the melt composition, and the molar ratio of carbon monoxide to carbon dioxide in said initial gaseous effluent is at least 9:1.

12. A process for producing a pipeline gas which comprises providing a reaction zone containing a molten salt consisting essentially of sodium carbonate containing from about 1 to about 25 wt.% sodium sulfide, said molten salt containing carbon in an amount of about 3.5 to 7.5% by weight of the molten salt and having a total solids concentration of less than about 25 wt.%, maintaining said molten salt at a temperature between about 1600° and about 1800° F, introducing a sulfur-containing coal and a mixture of pure oxygen and recycled carbon dioxide from the process into said molten salt reaction zone, said mixture of oxygen and carbon dioxide consisting of about 0.8 to about 1 mole of carbon dioxide per mole of oxygen, controlling the foregoing conditions without the introduction of steam to promote CO production and decompose said coal, the reaction being carried out at a pressure between 5 and 30 atmospheres whereby the sulfur component of the coal is retained in the molten salt, obtaining from said reaction zone an initial gaseous effluent principally containing carbon monoxide, and also containing hydrogen, hydrocarbons and carbon dioxide, the molar ratio of carbon monoxide to carbon dioxide in said gaseous effluent being at least 9:1, said gaseous effluent having a BTU content of from about 250 to 325 BTU/scf and being essentially free of sulfur-containing pollutants, sugjecting said gaseous effluent to a water gas shift reaction carried out to provide a molar ratio of hydrogen to carbon monoxide in the resultant gaseous mixture from said water gas shift reaction of about 3:1, recovering said resultant gaseous mixture containing carbon dioxide, carbon monoxide and hydrogen, removing carbon dioxide from said last-mentioned mixture, recycling a portion of said carbon dioxide for admixture with oxygen prior to introduction thereof into said molten salt, subjecting the remaining synthesis gas mixture of hydrogen and carbon monoxide in a molar proportion of about 3:1 to methanation, and recovering a pipeline gas consisting essentially of methane.

* * * * *

UNITED STATES PATENT AND TRADEMARK OFFICE
CERTIFICATE OF CORRECTION

PATENT NO. : 4,017,271
DATED : April 12, 1977
INVENTOR(S) : Kenneth M. Barclay et al It is certified that error appears in the above-identified patent and that said Letters Patent is hereby corrected as shown below:

Column 12, line 42, "ae" should read --are--.

Column 13, lines 39-40, "META (monoethanolmine)" should read --MEA (monoethanolamine)--.

Column 18, line 17, "shwon" should read --shown--; line 55, after "within the" insert --gasifier of about 1000°C. A sidestream of molten--; line 61, "705" should read --70%--; line 61, "CO2" should read --$CO_2$--; lines 64-65, "specifically" should read --Specifically--; line 67, "steam" should read --Steam--.

Column 19, lines 19-20, "themethanator" should read --the methanator--; line 49, "practices" should read --practiced--.

Signed and Sealed this

Fifteenth Day of May 1984

[SEAL]

Attest:

GERALD J. MOSSINGHOFF

Attesting Officer     Commissioner of Patents and Trademarks